United States Patent
Bieneman et al.

(10) Patent No.: US 9,903,310 B2
(45) Date of Patent: Feb. 27, 2018

(54) PISTON WITH ANTI-CARBON COATING AND METHOD FOR APPLYING AN ANTI-CARBON COATING ON A PISTON

(71) Applicant: MAHLE International GmbH, Stuttgart (DE)

(72) Inventors: Jason Bieneman, Ann Arbor, MI (US); Nikhil Nachappa, Dearborn, MI (US)

(73) Assignee: MAHLE International GmbH, Stuttgart (DE)

( * ) Notice: Subject to any disclaimer, the term of this patent is extended or adjusted under 35 U.S.C. 154(b) by 58 days.

(21) Appl. No.: 15/147,398

(22) Filed: May 5, 2016

(65) Prior Publication Data

US 2017/0321627 A1    Nov. 9, 2017

(51) Int. Cl.
| | |
|---|---|
| F02F 3/14 | (2006.01) |
| F02F 3/26 | (2006.01) |
| C01B 21/064 | (2006.01) |
| C09D 5/16 | (2006.01) |
| B05D 1/18 | (2006.01) |
| B05D 1/02 | (2006.01) |
| B41F 15/08 | (2006.01) |

(52) U.S. Cl.
CPC .............. *F02F 3/14* (2013.01); *C01B 21/064* (2013.01); *C09D 5/1618* (2013.01); *C09D 5/1662* (2013.01); *F02F 3/26* (2013.01); *B05D 1/02* (2013.01); *B05D 1/18* (2013.01); *B41F 15/0895* (2013.01)

(58) Field of Classification Search
CPC . F16J 9/26; F16J 1/08; F16J 9/22; F16J 1/01; F16J 1/02; F02F 3/0084; F02F 1/20; C09D 179/08; C09D 5/00
See application file for complete search history.

(56) References Cited

U.S. PATENT DOCUMENTS

| | | | | |
|---|---|---|---|---|
| 7,287,459 B2* | 10/2007 | Tabata | ................... | F02F 3/105 |
| | | | | 92/159 |
| 7,743,746 B2* | 6/2010 | Maier | ................... | B05D 5/08 |
| | | | | 123/197.4 |
| 7,765,696 B2* | 8/2010 | Maier | ................... | B05B 3/10 |
| | | | | 29/888.048 |
| 8,020,530 B2 | 9/2011 | Taylor et al. | | |
| 8,181,623 B2 | 5/2012 | Kemnitz et al. | | |
| 9,476,454 B2* | 10/2016 | Adam | ................... | F16C 9/00 |
| 2006/0117947 A1* | 6/2006 | Tabata | ................... | F02F 3/105 |
| | | | | 92/223 |
| 2008/0163751 A1* | 7/2008 | Subramanian | ............ | F16J 1/01 |
| | | | | 92/223 |
| 2009/0058014 A1* | 3/2009 | Kariya | ................... | C23C 30/00 |
| | | | | 277/442 |
| 2013/0220115 A1* | 8/2013 | Kantola | ................... | F16J 1/006 |
| | | | | 92/187 |
| 2015/0219042 A1* | 8/2015 | Inwood | ................... | F02F 3/10 |
| | | | | 92/172 |

* cited by examiner

*Primary Examiner* — Long T Tran

(74) *Attorney, Agent, or Firm* — Collard & Roe, P.C.

(57) ABSTRACT

A piston having a piston crown with a combustion chamber, and a circumferential ring belt extending from the piston crown and having a plurality of ring grooves separated by piston lands. At least one of the piston lands, ring grooves or top surface of the crown is provided with a coating comprising hexagonal boron nitride. The coating can be made solely of hexagonal boron nitride, or can additionally include a resin. The coating can be a single layer coating or a multiple layer coating.

12 Claims, 3 Drawing Sheets

PISTON WITH ANTI-CARBON COATING AND METHOD FOR APPLYING AN ANTI-CARBON COATING ON A PISTON

BACKGROUND OF THE INVENTION

1. Field of the Invention

This invention relates to a piston having a coating on at least one piston land that deters the buildup of carbon. In particular, the invention relates to a piston that has a coating of hexagonal boron nitride (h-BN) on at least one of the piston lands or other areas of the piston.

2. The Prior Art

The buildup of carbon on piston lands, and in particular the top land of the piston, is a common problem, and can lead to degradation in the performance of the engine. This carbon buildup can also lead to wear on the piston liner, which leads to accelerated ring face wear and/or piston or ring scuffing. Additionally, if the land volume is partially or completely consumed by carbon, the dynamics of the piston rings can change, resulting in increased oil consumption for the engine.

Several attempts have been made to prevent such carbon build-up. For example, U.S. Pat. No. 8,020,530 to Taylor relates to piston having top land formed by a series of waves around the piston. Another method is to apply a coating to the piston, such as described in U.S. Pat. No. 7,383,806 to Abi-Akar et al. This coating is an electroless nickel PTFE coating.

It would be desirable to provide a way to prevent carbon buildup on piston lands and other parts of the piston that does not require altering the structure of the piston and which is simple and inexpensive to prepare.

SUMMARY OF THE INVENTION

These and other objects of the invention are accomplished by a piston having a piston crown portion with a combustion chamber and a circumferential ring belt extending from the piston crown. The ring belt has a plurality of ring grooves for holding piston rings. The ring grooves are separated by piston lands. It is the areas of these piston lands that are most subject to carbon build up during engine use. To counteract this, at least one exterior surface of the piston is provided with a coating comprising hexagonal boron nitride (h-BN). Preferably, at least the top piston land is provided with the h-BN coating. The other piston lands, the ring grooves, the top surface of the crown surrounding the combustion bowl, and/or the underside of the piston could also be coated with h-BN if desired. In a preferred embodiment, only the top land is coated with the h-BN coating and all other areas of the piston are not coated with h-BN.

Hexagonal boron nitride is a low surface energy coating that deters the formation of carbon on the areas to which it is applied. The h-BN can be applied using any desired method, but spraying, screen printing or masking and dipping is particularly preferable.

To assist in adhesion of the h-BN and to increase the wear-resistance of the coating, the coating can be applied in several layers. In addition, the coating could also be a multi-component coating having a resin as a binder. For example a particularly effective and wear-resistant coating can be obtained by first applying a layer of manganese phosphate (MnP) to the steel substrate, then applying a layer of h-BN mixed with a resin as a bondcoat, and then applying one or more layers of pure h-BN. The bondcoat is preferably applied using a screen printing process or a spraying process. Alternatively, the bondcoat layer alone can be used as the coating, without the layers of pure h-BN added on top.

The resin in the bondcoat can be any suitable resin. Examples of resins useful for this purpose are tetraethyl orthosilicate (TEOS), polyamide-imide (PAI) and polyimide (PI).

In another embodiment, the coating comprises a first layer of manganese phosphate (MnP), a second layer consisting of the bondcoat described above, and a top layer of pure hexagonal boron nitride. The top layer can be a single or double application of h-BN. Both the bondcoat and the pure h-BN layers can be sprayed on or applied as a screen printing process, or a dipping process, with masking covering the uncoated areas.

In yet another embodiment, the coating can comprise simply the MnP layer and one or more layers of pure h-BN, without the bondcoat.

The invention also relates to a method for applying the coating to a piston to prevent carbon buildup on the piston. The method can comprise the step of applying hexagonal boron nitride to at least one of the piston lands, top surface of the crown, ring grooves or underside, in one or two applications. The h-BN can be first mixed with a resin, or can be applied as a pure h-BN coating by mixing the h-BN in an ethanol base which evaporates during drying of the coating. The method involves cleaning the piston with a cleaner such as acetone, pre-heating the piston in an oven for 30 minutes at 50° C., applying a coating of hexagonal boron nitride on at least one piston land by spraying, screen printing or dipping, heating the piston in an oven again for 30 minutes at 50° C., applying a second coating of hexagonal boron nitride on top of the first coating, and curing the piston in an oven at 300° C. for 1 hour.

The coating can be sprayed on with an industrial spray gun, or can be screen printed or applied in any other suitable manner. Another suitable method is to mask the areas of the piston that are not to be coated, and then dip the piston in the coating, to apply the coating to only the unmasked areas. This method is particularly effective for coating the ring grooves.

Prior to application of the h-BN layers, the method can also include applying a layer of manganese phosphate (MnP) to the piston, and applying a layer of hexagonal boron nitride mixed with a resin on top of the MnP, to create a bondcoat. Any combination of layers of MnP, bondcoat and pure h-BN could be used to create the coating according to the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE EMBODIMENTS

Figure 1:
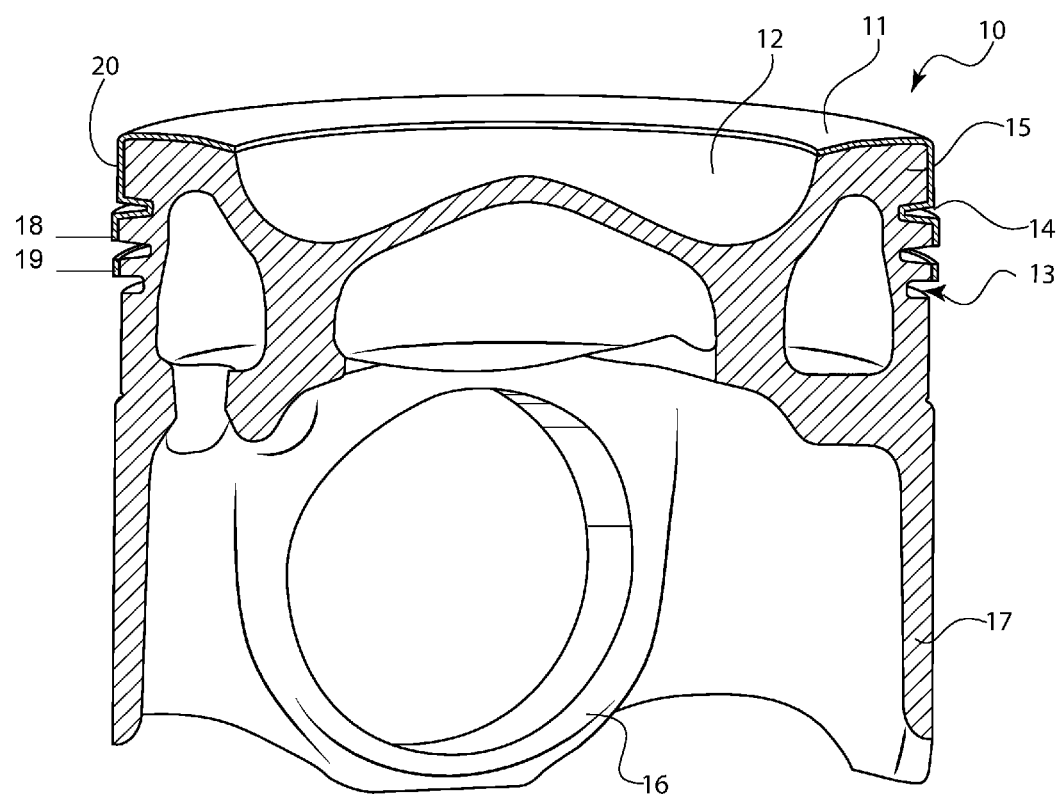
FIG. 1 shows a cross-sectional view of a piston according to the invention, showing the coating on the top of the piston crown, as well as on some of the piston lands and ring grooves.

FIG. 1 shows a cross-section of a piston according to the invention. Piston 10 consists of a piston crown 11 having a combustion chamber 12, a ring carrier 13 with several ring grooves 14 separated by piston lands 15. There is a pin boss 16 for supporting piston pin, and a piston skirt 17 connecting the pin bosses.

Surrounding the uppermost land 15, as well as the top of the crown 11, lower lands 18, 19 as well as ring groove 14 is a coating 20 formed of hexagonal boron nitride (h-BN).

Coating 20 can be a single or multi-layer coating, and can be formed of pure h-BN or can have other ingredients as well. Preferably, only uppermost land 15 is coated, with the other areas of the piston left uncoated. Alternatively, only the top surface of crown 11 surrounding the combustion bowl is coated, with the rest of the piston left uncoated.

Figure 2:
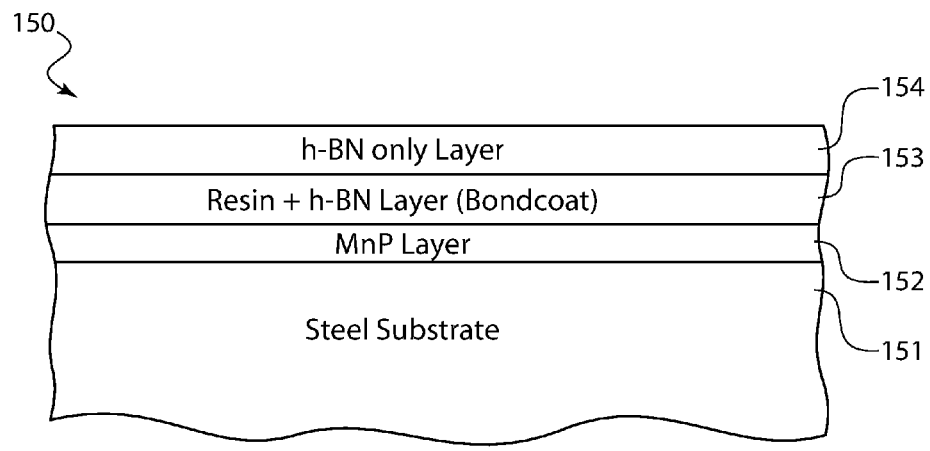
FIG. 2 shows an enlarged view of a steel substrate having a multi-layer coating according to the invention.
Figure 3:
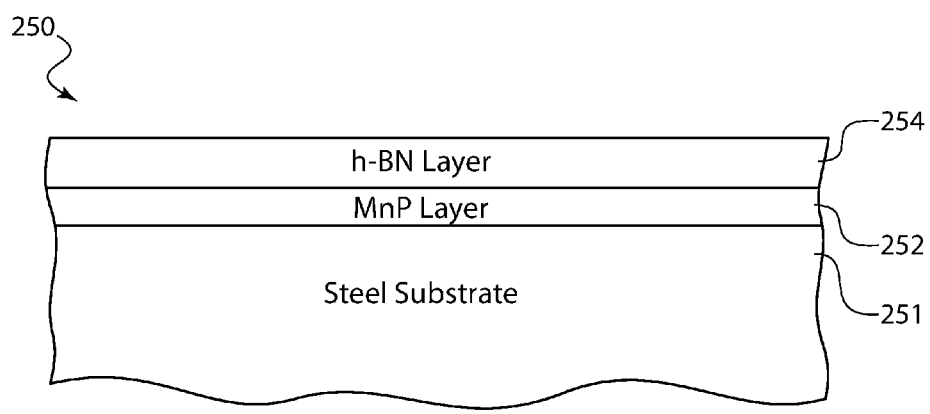
FIG. 3 shows another variation of the coating according to the invention.

An exemplary coating according to the invention is shown in FIG. 2. Coating 150 is disposed on a steel substrate 151 such as a piston land 15 shown in FIG. 1. Coating 150 consists of three or more layers. A first layer 152 of MnP is deposited directly onto substrate 151, followed by a bondcoat layer 153 of h-BN mixed with a resin. This can be applied via spraying with an industrial spray gun, or via screen printing or by masking and dipping. The resin can be any suitable resin, such as tetraethyl orthosilicate (TEOS), polyamide-imide (PAI) and polyimide (PI). Finally, a layer 154 of pure h-BN is deposited on top. This layer can also be applied by spraying, screen printing or dipping. The pure h-BN is prepared in an ethanol base, which evaporates after drying, leaving only h-BN as the coating layer. FIG. 3 shows another embodiment 250, in which the bondcoat has been eliminated. Here, a layer 252 of MnP is applied to the substrate 252, followed directly by one or more layers 254 of h-BN without any resin mixed in. Each of the one or more layers may have varying thickness to accommodate various demands within the piston and engine application. In one example, the MnP 152 is approximately between 1 to 15 microns, and each of the bondcoat layer 153 and the pure h-BN layer 154 may vary from 1 to 300 microns depending on the resins utilized and the method of application. Any variation and number of layers could be used to create the desired coating.

Figure 4:
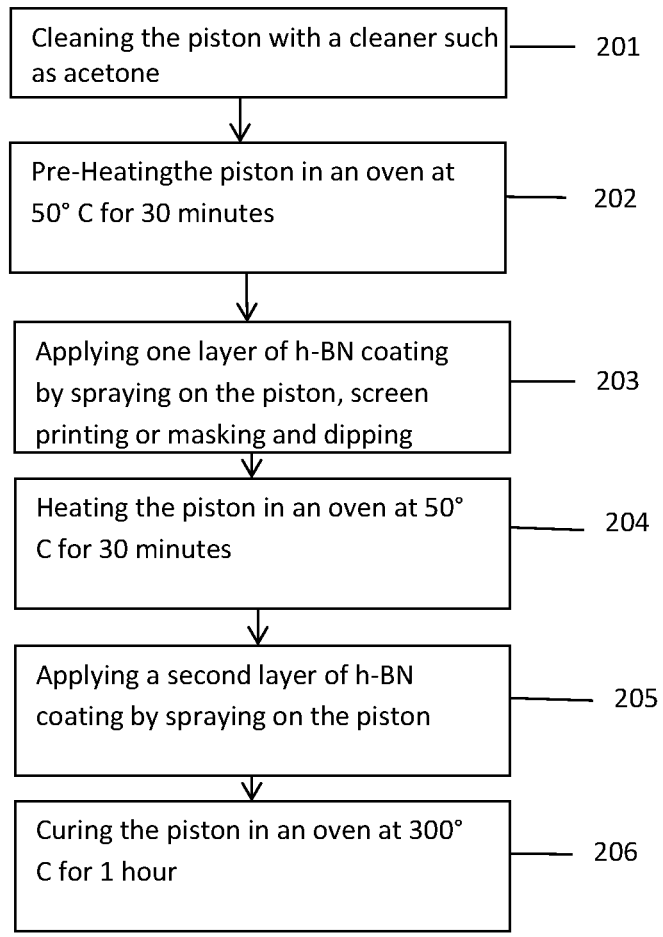
FIG. 4 shows a flow diagram of the steps for performing one embodiment of the method according to the invention.

The invention also relates to a method for applying a coating to a piston. The method can vary depending on whether the coating is a single layer or multiple layer coating, and whether there are additives to the h-BN. For a double layer coating consisting of pure h-BN or h-BN mixed with a bonding resin, the method steps can be performed as shown in FIG. 4. In step 201, the piston is first cleaned with acetone or other suitable cleaner. Then, in step 202, the piston is pre-heated in an oven at 50° C. for 30 min. In step 203, a layer of h-BN is applied to the piston land or groove by spraying the coating on with an industrial spray gun, screen printing or dipping. Subsequently, the piston is again heated in an oven at 50° C. for 30 minutes in step 204. A second layer of h-BN is applied in step 205 in the same manner as the first layer. Finally, in step 206, the piston is cured in an oven for 1 hour at 300° C. Additional method steps, involving the application of MnP or additional bondcoat layer could also be added to the method according to the invention.

The method according to the invention provides a simple and inexpensive way to prevent carbon buildup on piston parts, especially the top land, without changing the structure of the piston. The composition and thickness of the coating can be varied based on technical needs, and the coating can be applied wherever carbon buildup is an issue.

Accordingly, while only a few embodiments of the present invention have been shown and described, it is obvious that many changes and modifications may be made thereunto without departing from the spirit and scope of the invention.

What is claimed is:

1. A piston for an internal combustion engine comprising:
    a piston crown having a combustion chamber, and
    a circumferential ring belt extending from the piston crown and having a plurality of ring grooves separated by piston lands,
    wherein at least one exterior surface of the piston is provided with a multi-layer coating comprising the following components:
    a first layer of manganese phosphate;
    a second layer consisting of a mixture of hexagonal boron nitride with resin; and
    a top layer of pure hexagonal boron nitride.

2. The piston according to claim 1, wherein the at least one surface comprises one of the piston lands, one of the ring grooves, a top surface of the piston crown or an underside of the piston.

3. The piston according to claim 2, wherein the at least one surface comprises an uppermost piston land.

4. The piston according to claim 2, wherein only the top surface of the piston crown is coated with the coating.

5. The piston according to claim 2, wherein only an uppermost land of the piston is coated with the coating.

6. The piston according to claim 1, wherein the resin is selected from the group consisting of tetraethyl orthosilicate (TEOS), polyamide-imide (PAI) and polyimide (PI).

7. A method of providing an anti-carbon coating on a piston having a crown and a circumferential ring carrier with a plurality of ring grooves and piston lands, the method comprising:
    applying a layer of MnP to the at least one exterior surface of the piston;
    mixing h-BN with a resin to create a bondcoat;
    applying the bondcoat to the at least one exterior surface of the piston; and
    applying a layer of pure h-BN to the at least one exterior surface of the piston.

8. The method according to claim 7, wherein the at least one surface is selected from the group consisting of the piston lands, ring grooves and a top surface of the crown.

9. The method according to claim 7, wherein the coating is applied via spraying, dipping or screen printing.

10. The method according to claim 7, wherein the piston is heated prior to application of each coating at 500 C for 30 min, and the final heating takes place at 3000 C for 1 hour.

11. The method according to claim 7, wherein the coating is applied only to an uppermost land of the piston.

12. The method according to claim 7, wherein the coating is applied only to a top surface of the crown.

* * * * *